United States Patent [19]

Chambers

[11] 3,994,475
[45] Nov. 30, 1976

[54] RACK TYPE JACKING APPARATUS

[75] Inventor: Henry B. Chambers, Santa Inez, Calif.

[73] Assignee: Hydranautics, Goleta, Calif.

[22] Filed: Apr. 2, 1976

[21] Appl. No.: 673,148

[52] U.S. Cl. ............................................. 254/108
[51] Int. Cl.² ........................................ B66F 1/08
[58] Field of Search ............................ 254/108–111

[56] References Cited
UNITED STATES PATENTS

| | | | |
|---|---|---|---|
| 2,043,141 | 6/1936 | Wilmesherr | 254/108 |
| 2,437,078 | 3/1948 | Crane | 254/108 |
| 3,273,859 | 9/1966 | Walli | 254/109 |

*Primary Examiner*—Al Lawrence Smith
*Assistant Examiner*—Robert C. Watson
*Attorney, Agent, or Firm*—Clement H. Allen

[57] ABSTRACT

A jacking apparatus comprises a rail with an attached vertical rack having teeth with a steep front face and a sloping back. A notch is arranged in the back of each of the rack teeth. A pair of cars are slidably mounted on the rail with each car carrying a pair of latches, one of which is engageable with the front face of a rack tooth and the other with the notch in the back of that tooth. Reciprocal motion, away from and toward each other, is imparted to the cars while the latches selectively engage teeth in the rack to cause progressive incremental travel of the cars along the rail, to move a load attached to one of them.

6 Claims, 8 Drawing Figures

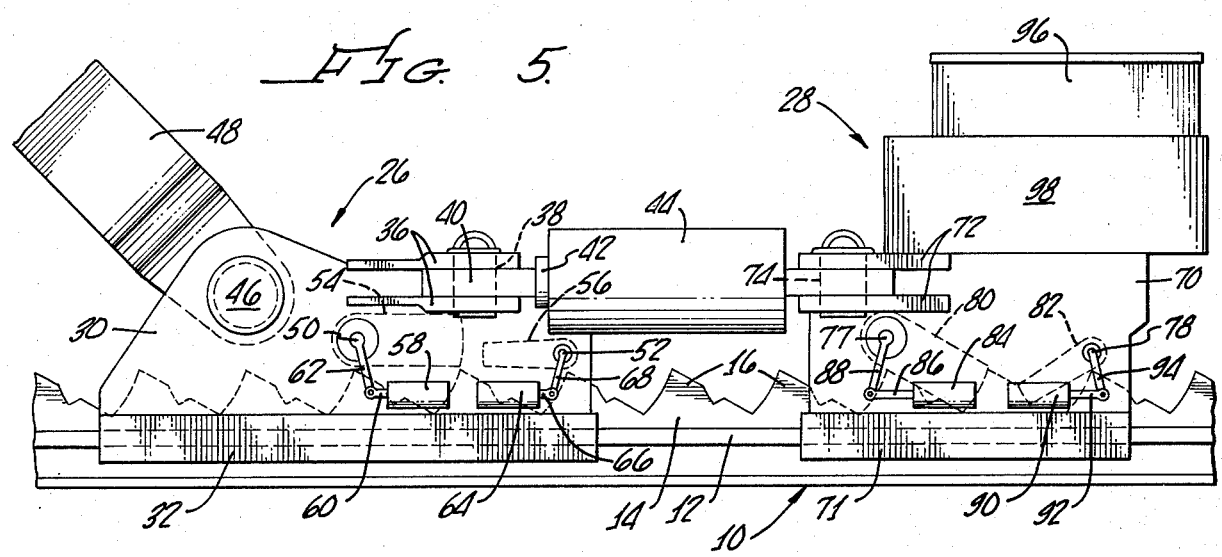
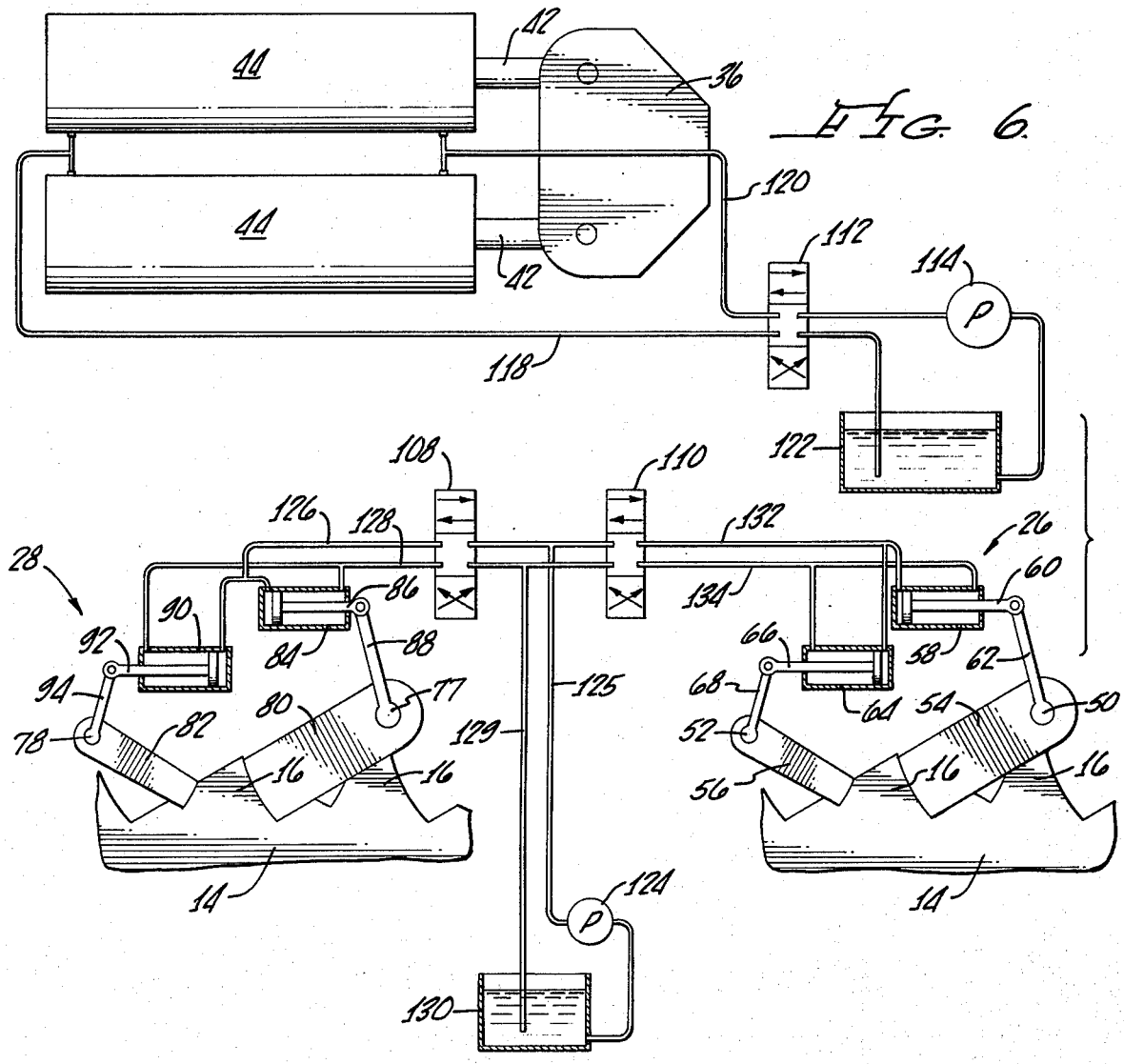

RACK TYPE JACKING APPARATUS

BACKGROUND OF THE INVENTION

1. The Field of the Invention

This invention relates to jacking apparatus for moving a heavy load along a rail.

2. The Prior Art

Many types of jacking arrangements have been used and proposed for moving heavy loads along a rail or track. A rack is often attached to the rail, and a pair of cars, each carrying a dog, pawl or latch for engagement with the teeth of the rack, are slidably mounted on the rail. Reciprocal motion with respect to each other is imparted to the cars with selective engagement of the dogs, pawls or latches with the rack teeth, to cause progressive, incremental travel of the cars along the rail to move a load attached to one of them.

Such arrangements, however, are not well adapted for moving loads that are bi-directional. They do not ordinarily provide efficient moving of surging loads, for example, encountered in lifting pipe or jacket loads on a barge which may itself be subject to rising and falling wave action.

SUMMARY OF THE INVENTION

This invention comprises jacking apparatus having a toothed, vertical rack attached to a rail, a pair of cars slidably mounted on the rail, and a pair of latches is mounted on each of the cars for selective engagement with the teeth of the rack on reciprocal motion of the cars with respect to each other to cause progressive movement of a load attached to one of the cars. The rack teeth are particularly designed each with a steep front face, and a sloping back having a notch. Preferably the front face is inclined at an angle of generally between about 110° and 130° to the horizontal plane of the rail on which the rack is mounted. The back face, sloping at a flatter angle than the steep front face, is preferably inclined at an angle of generally between about 140° and 160° to the horizontal plane of the rail, that is measured backwards. The rear face of the notch in the sloping back of each tooth is inclined at an angle of between about 110 and 130 degrees to the plane of the rail also measured backwards so that its inclination is in the opposite direction to that of the front face. Preferably the front faces of the teeth and the rear faces of the notches in the sloping backs of the teeth are arcuate to mate snugly with arcuate ends of the pair of latches pivotably mounted on each of the cars.

Means, such as one or more hydraulic cylinders, impart reciprocal motion of the cars with respect to each other while means such as additional hydraulic cylinders cause selective engagement of each pair of latches with the teeth of the rack, one latch of each pair engaging the front face of a tooth and the other engaging the notch in the rear face of that tooth. Incremental progressive travel along the rail is thereby imparted to the cars with corresponding movement of a load attached to one of them.

BRIEF DESCRIPTION OF THE DRAWINGS

In the drawings:

FIG. 5 shows a back view of the apparatus of FIG. 1 illustrating the latch actuating mechanisms.

FIG. 6 shows, diagrammatically, simplified hydraulic circuits for actuation of the cars and latches of the apparatus of FIG. 1.

DESCRIPTION OF A PREFERRED EMBODIMENT

Figure 1:
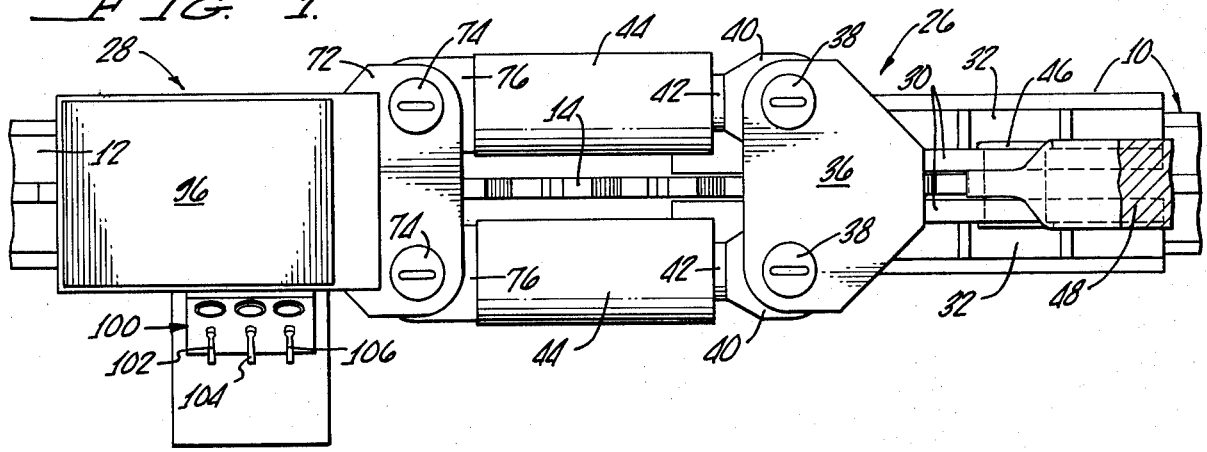
FIG. 1 shows a top view of jacking apparatus embodying features of this invention.
Figure 2:
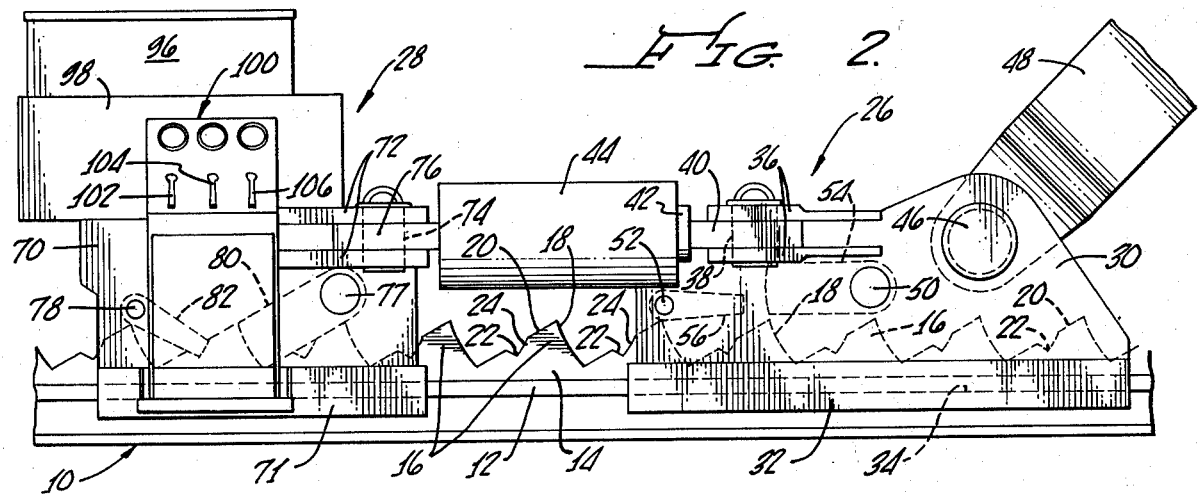
FIG. 2 shows a front view of the jacking apparatus of FIG. 1.
Figure 3:
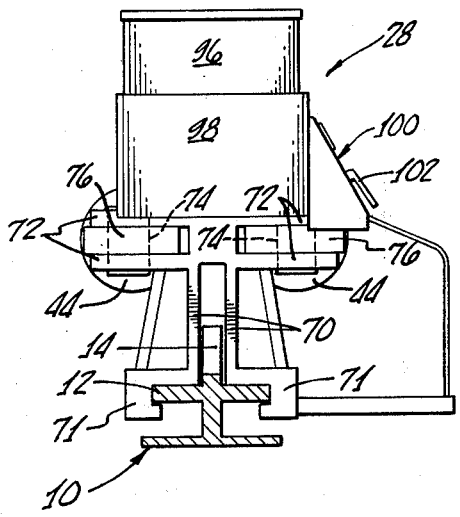
FIG. 3 shows an end view of the jacking apparatus of FIG. 1.
Figure 4:
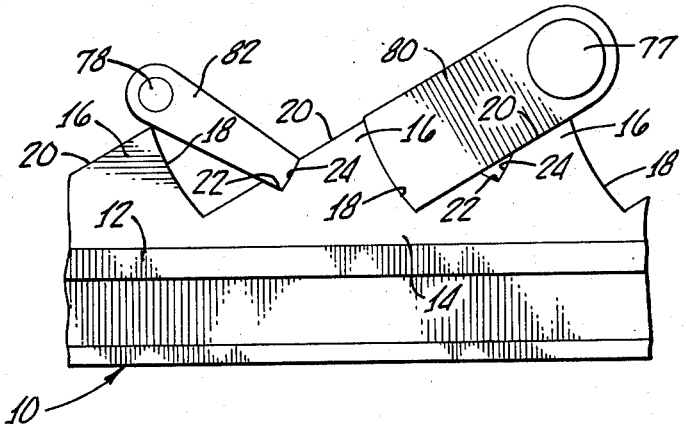
FIG. 4 shows an enlarged detail of the profile of the teeth of the rack of the apparatus of FIG. 1.

Referring now particularly to FIGS. 1, 2 and 3, the jacking apparatus comprises a rail 10 having a top flange 12. A vertical rack 14 is fixedly attached to rail 10 above flange 12 and has a series of upwardly projecting teeth 16. The front face 18 of each of teeth 16 is steep and inclines generally to the plane of rail 10 at an angle of between about 110° and 130°, taken from the front, as will be seen more clearly in the profile detail of FIG. 4. Preferably the front face 18 is arcuate for reasons discussed hereinafter. The back 20 of each of teeth 16 is sloping, not steep like front face 18, and is inclined to the rail at an angle of between about 140° and 160°, taken from the back. Additionally, back 20 of each of teeth 16 is provided with notch 22 having a rear face 24 inclined to the plane of rail 10 at an angle generally of between about 110 degrees to 130 degrees, taken from the back. Rear face 24 of notch 22 may also be arcuate as discussed hereinafter. It will be understood that the general or over-all inclination of notch rear face 24 and front face 18 of teeth 16 will generally fall within the angular limits given, even though their surfaces may be slightly arcuate and not plane.

Two cars are slidably mounted on rail 10, the right hand one in the drawings being identified as holding car 26 and the left hand one being identified as jacking car 28. Holding car 26 comprises a pair of vertical spaced apart plates 30, forming a slot in which is located vertical rack 14, and which are provided with bases 32 having grooves 34 mating with the side edges of rail flange 12. Fixedly attached to plates 30, and joining them near their rear (the left hand end in FIGS. 1 and 2), are a pair of vertically spaced apart horizontal cross heads 36, between which are attached as by pins 38 the ends 40 of piston rods 42 of a pair of hydraulic cylinders 44. Between vertical plates 30 and in a position toward their front ends (toward the right in FIGS. 1 and 2 as shown) is firmly attached a strong pin 46 which may be used for pivotable attachment of the perforated tongue of a bar 48 which may be connected to the load to be moved. Rotatably mounted between vertical plates 30 are horizontal shafts 50 and 52 to which are respectively fixedly attached latches 54 and 56. Latch 54 is somewhat larger than latch 56 and its support shaft 50 is correspondingly larger than shaft 52. The end of latch 54 remote from shaft 50 is preferably arcuate to mate with the arcuate surface of front face 18 of one of rack teeth 16 when latch 54 is lowered by rotation of shaft 50 by means hereinafter described. The end of latch 56 remote from shaft 52 is also preferably arcuate to mate with arcuate face 24 of notch 22 in the back 20 of a rack tooth 16.

On the back side of the rear vertical plate 30, as will be seen in FIG. 5, is pivotally mounted the base of a hydraulic cylinder 58 whose piston rod 60 is pivotably attached to a crank 62 which in turn is fixedly attached to a projecting end of shaft 50 carrying latch 54. In like manner, the base of another hydraulic cylinder 64 is pivotably mounted on the same plate 30, and to whose piston rod 66 is pivotably attached crank 68 which in turn is fixedly attached to a projecting end of shaft 52 carrying latch 56.

Jacking car 28 comprises a pair of spaced apart vertical plates 70 having grooved bases 71 mating also with side edges of rail flange 12, and to which are fixedly attached near their front ends (towards the right in FIGS. 1 and 2) a pair of vertically spaced cross heads 72 between which are attached, as by pins 74, the base ends 76 of hydraulic cylinders 44. Rotatably mounted between vertical plates 70 are horizontal shafts 77 and 78 to which are respectively fixedly attached latches 80 and 82. Latch 80 corresponds in dimensions to latch 54 on holding car 26 and latch 82 corresponds in like manner to latch 56.

On the back side of the rear vertical plate 70, as will be seen in FIG. 5, is pivotably mounted the base of hydraulic cylinder 84 whose piston rod 86 is pivotably attached to crank 88 which in turn is fixedly attached to a projecting end of shaft 77 carrying latch 80. In like manner, the base of another hydraulic cylinder 90 is pivotably on the same plate 70, and to whose piston rod 92 is pivotably attached crank 94 which in turn is fixedly attached to a projecting end of shaft 78 carrying latch 82.

Mounted on jacking car 28 are a hydraulic fluid reservoir 96, a power unit 98 for supplying hydraulic fluid under pressure to the hydraulic cylinders, and a control console 100 equipped with handles 102, 104, and 106 to operate respectively valves 108, which controls the direction of pressurized oil flow into the jacking car hydraulic cylinders 84 and 90, valve 110 which controls the direction of pressurized oil flow into holding car hydraulic cylinders 58 and 64, and valve 112 which controls the direction of pressurized oil flow into hydraulic cylinders 44; the valves and hydraulic circuits being diagramatically illustrated in FIG. 6.

Referring now particularly to FIG. 6, and specifically to the upper section thereof, hydraulic cylinders 44 are supplied with pressurized oil by pump 114, this oil supply being directed by three-position valve 112 either through oil line 118 to the left hand (as shown) sides of the pistons in cylinders 44 which extends their piston rods and moves holding car 26 and jacking car 28 away from each other on rail 10; oil from the other sides of the pistons being returned through oil line 120 to reservoir 122. Or, oil may be directed through oil line 120 under pressure to the right hand sides of the pistons in hydraulic cylinders 44 to move holding car 26 and jacking car 28 toward each other on rail 10; oil from the other sides of the pistons being returned to reservoir 122 through oil line 118.

In the lower section of FIG. 6, which has latch elements arranged in the same relative position as in FIG. 2, a somewhat smaller pump 124 supplies pressurized oil to three-position valves 108 and 110 which respectively control oil flow into either the left hand or the right hand ends of hydraulic cylinders 84 and 90 on jacking car 28, and into either the left hand or the right hand ends of hydraulic cylinders 58 and 64 on holding car 26. To release jacking car latches 80 and 82 from one of teeth 16 of rack 14, oil is directed by valve 108 through oil lines 125 and 126 into the left hand end of hydraulic cylinder 84 and into the right hand end of hydraulic cylinder 90. Oil is returned from the other ends of hydraulic cylinders 84 and 90 through oil lines 128 and 129 into reservoir 130. In like manner, to release holding car latches 54 and 56 from a tooth 16 of rack 14, oil is directed by valve 110 through oil lines 125 and 132 into the left hand end of hydraulic cylinder 58 and into the right hand end of hydraulic cylinder 64. Oil is returned from the other ends of hydraulic cylinders 58 and 64 through oil lines 134 and 129 into reservoir 130. It will be apparent that to engage latches 54, 56, 80 and 82 with teeth 16 of rack 14 from a released position, opposite settings or adjustment of valves 108 and 110 will be required.

Figure 7:
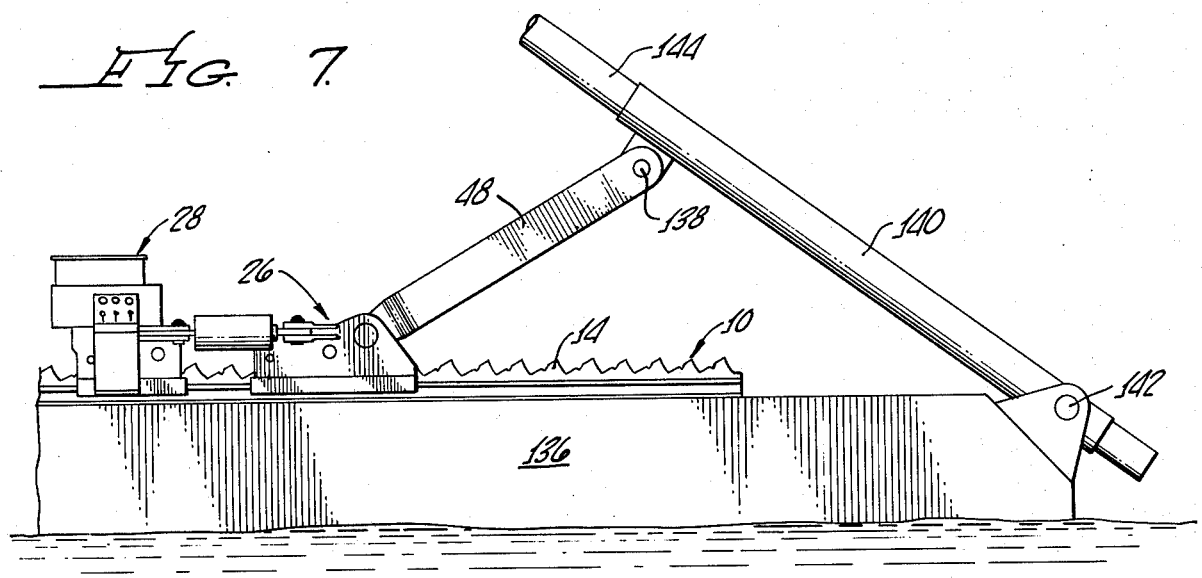
FIG. 7 shows a front view of apparatus of this invention employed in a double system for moving heavy pipe laying loads.
Figure 8:
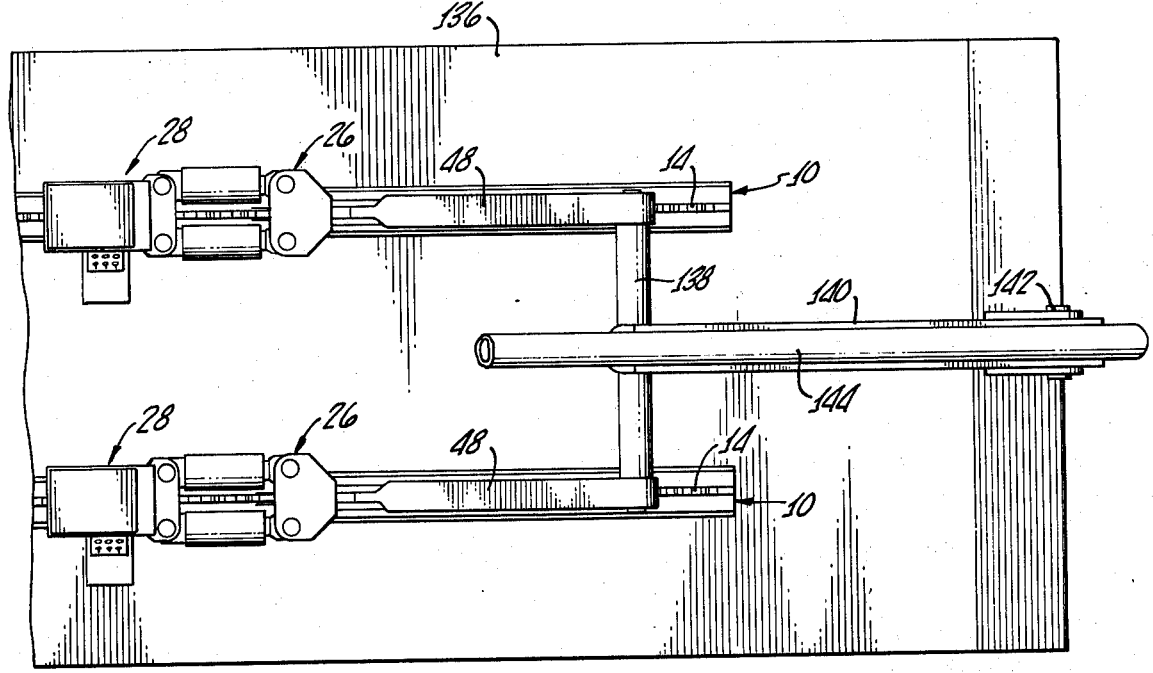
FIG. 8 shows a top view of the system of FIG. 7.

In FIGS. 7 and 8 are shown a system comprising a pair of jacking arrangements according to this invention in which two rails 10 are fixedly laid in parallel spaced apart relationship on the deck of a barge 136. Two pairs of holding cars 26 and jacking cars 28 are mounted on the rails 10, the two bars 48 from cars 26 being pivotably attached to a heavy cross bar 138 which is attached to and supports a load such as pipe laying ramp 140, shown in simplified form for convenience of illustration. The lower end of ramp 140 is pivotably attached to the stern of barge 136 as at 142. By jacking action through bars 48 the angle of stern ramp 140 may be adjusted to suit laying conditions for a pipe 144 supported or jacketed therein. The hydraulic circuits for actuating the latches and moving the cars on each rail may be controlled to operate these elements in unison or the hydraulic systems may be interconnected and synchronized.

In operation of the jacking apparatus of this invention, for example to raise a load which might be the stern ramp 140 in FIG. 7, the jacking car 28 and holding car 26 will first be positioned toward the bow of barge 136 and close together with the piston rods of hydraulic cylinders 44 retracted, and with latches 54, 56, 80 and 82 engaged with teeth 16 of rack 14 to hold the load. Valve 110 is then actuated to cause release of latches 54 and 56 from rack 14, and valve 112 is actuated to cause extension of the piston rods in hydraulic cylinders 44. This frees holding car 26 from rack 14 and it is moved aft (to the right) away from jacking car 28 by action of hydraulic cylinders 44, thus causing bar 48 to raise stern ramp 138. When hydraulic cylinders 44 have reached the end of their stroke, valve 112 is placed in neutral position and valve 110 is actuated to cause re-engagement of latches 54 and 56 with teeth 24 of rack 22. With latches 54 and 56 now holding the load of stern ramp 138, valve 108 is actuated to release latches 80 and 82 from teeth of rack 14 and valve 112 is now actuated to direct pressurized oil into the right hand ends of hydraulic cylinders 44, thus causing retraction of their piston rods and thereby moving jacking car 18 aft toward holding car 28. When the piston rods of hydraulic cylinders 44 are fully retracted, valve 112 is placed in neutral position and valve 108 is actuated to cause re-engagement of latches 80 and 82 with the teeth 16 of rack 14. The cycle may be repeated to raise the stern ramp 140 by progressive increments to the desired angle. To lower, or reduce the angle of stern ramp 140, valve 108 is first actuated to release latches 80 and 82 and then jacking car 28 is moved forward (to the left) by action of hydraulic cylinders 44. At the end of their stroke, latches 80 and 82 are re-engaged with teeth 16 of rack 14 and latches 54 and 56 disengaged while holding car 26 is moved toward jacking car 28 by retraction of the piston rods in hydraulic cylinders 44. The lower cycle, like the raise cycle, may be repeated by progressive increments to lower the load to the desired position.

For simple installations a single rail on which ride the cars and jacking mechanism, as shown in FIGS. 1 to 3 may be employed. It will be appreciated that for a more stable assembly, and to better resist side loads and thrusts, a pair of rails with jacking mechanisms on each may be arranged in side by side relation as illustrated in FIGS. 7 and 8.

The jacking apparatus of this invention is advantageous to move heavy loads which at times may be bi-directional. For example, barge 136 shown in FIG. 7 may be subjected to rising and falling wave action while pipe 139 supported by ramp 138 is being laid along the sea bottom. The load, however, will be held safely and securely by the double latch arrangement working in conjunction with the particular rack tooth profile even though bi-directional, that is in this case up as well as down, loads are being encountered. The latch arrangement comprising relatively large latches engaging steep front faces of rack teeth are advantageous to bear the greater forces involved in handling a heavy load, while the relatively smaller latches engaging notches in the sloping backs of the teeth are adequate for holding the somewhat lighter loads in the reverse direction.

The particular angles of the front faces and notch faces in the sloping backs of the teeth in the rack according to this invention are important to provide sufficient perpendicularity to the latch and tooth mating surfaces so that heavy thrusts may be taken at a desirable angle relative to the plane of the rail. These angles, however, are additionally convenient for ready arrangement of pivoted latches to move in and out of engagement with the tooth faces. Arcuate latch ends and tooth faces provide excellent surface contact between the latch ends and tooth faces and at the same time permit swinging of the latches in and out through an arc of a circle having its center at the latch pivot point. Provision of a tooth profile with a steep front face and a sloping back is important to provide a strong tooth configuration for carrying a heavy load against the front face, yet still providing a back face which can be notched to accommodate a smaller latch.

I claim:

1. Jacking apparatus having a rail, a toothed rack attached to said rail, a pair of cars slidably mounted on said rail, latches attached to each of said cars for selective engagement with the teeth of said rack on reciprocal motion of said cars with respect to each other to cause progressive movement of a load attached to one of said cars; in which the improvement comprises:
    a. each of the teeth of said rack having a steep front face and a sloping back, said back of each of said teeth having a notch;
    b. a pair of latches pivotably mounted on each of said cars, one of each of said pairs of latches adapted to selectively engage the front face of one of said teeth of said rack and the other of said pair of latches being adapted to selectively engage the notch in the back of said one of said teeth; and,
    c. means for sequentially causing said pair of latches on one of said pair of cars to engage a tooth of said rack and the latches on the other of said cars to be released from said teeth, while means are actuated to move said cars reciprocally and repetitively with respect to each other, thereby imparting incremental progressive travel of said cars along said rail and corresponding movement of a load attached to one of said cars.

2. Jacking apparatus according to claim 1 in which said front face of each of said teeth is inclined to the plane of said rail at an angle of between about 110° and 130°.

3. Jacking apparatus according to claim 1 in which said sloping back of each of said teeth is inclined to the plane of said rail at an angle of between about 140° and 160°.

4. Jacking apparatus according to claim 1 in which the face of said notch in said sloping back in each of said teeth is inclined to the plane of said rail at an angle of between about 110° and 130°.

5. Jacking apparatus according to claim 1 in which the ends of said latches and the faces of said teeth which they engage are correspondingly arcuate.

6. Jacking apparatus according to claim 1 in which a pair of said rails are fixedly mounted in parallel spaced apart relationship; a pair of said cars are slidably mounted on each of said pair of rails; a cross bar connects one of each of said pairs of cars; and means for moving a load are attached to said cross bar.

* * * * *